Patented Feb. 26, 1946

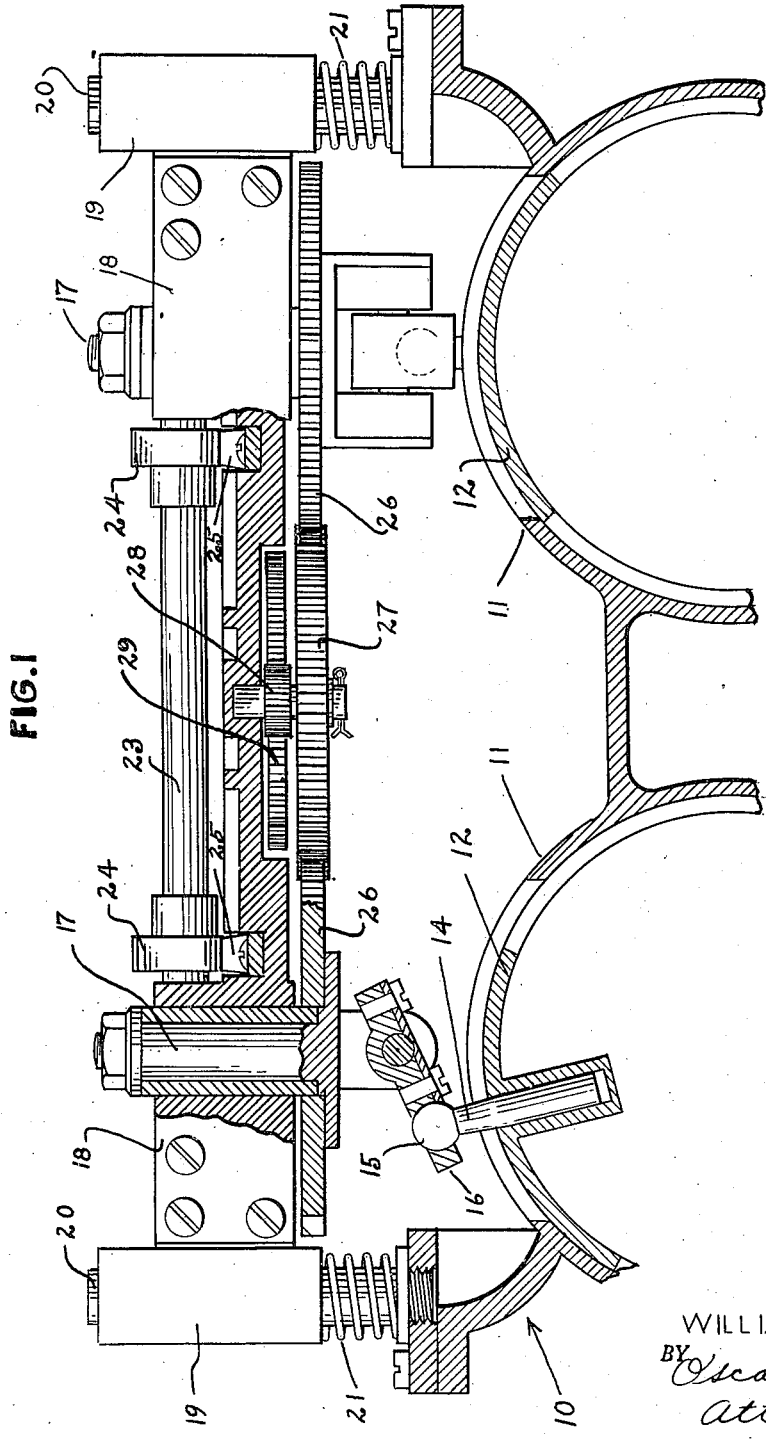

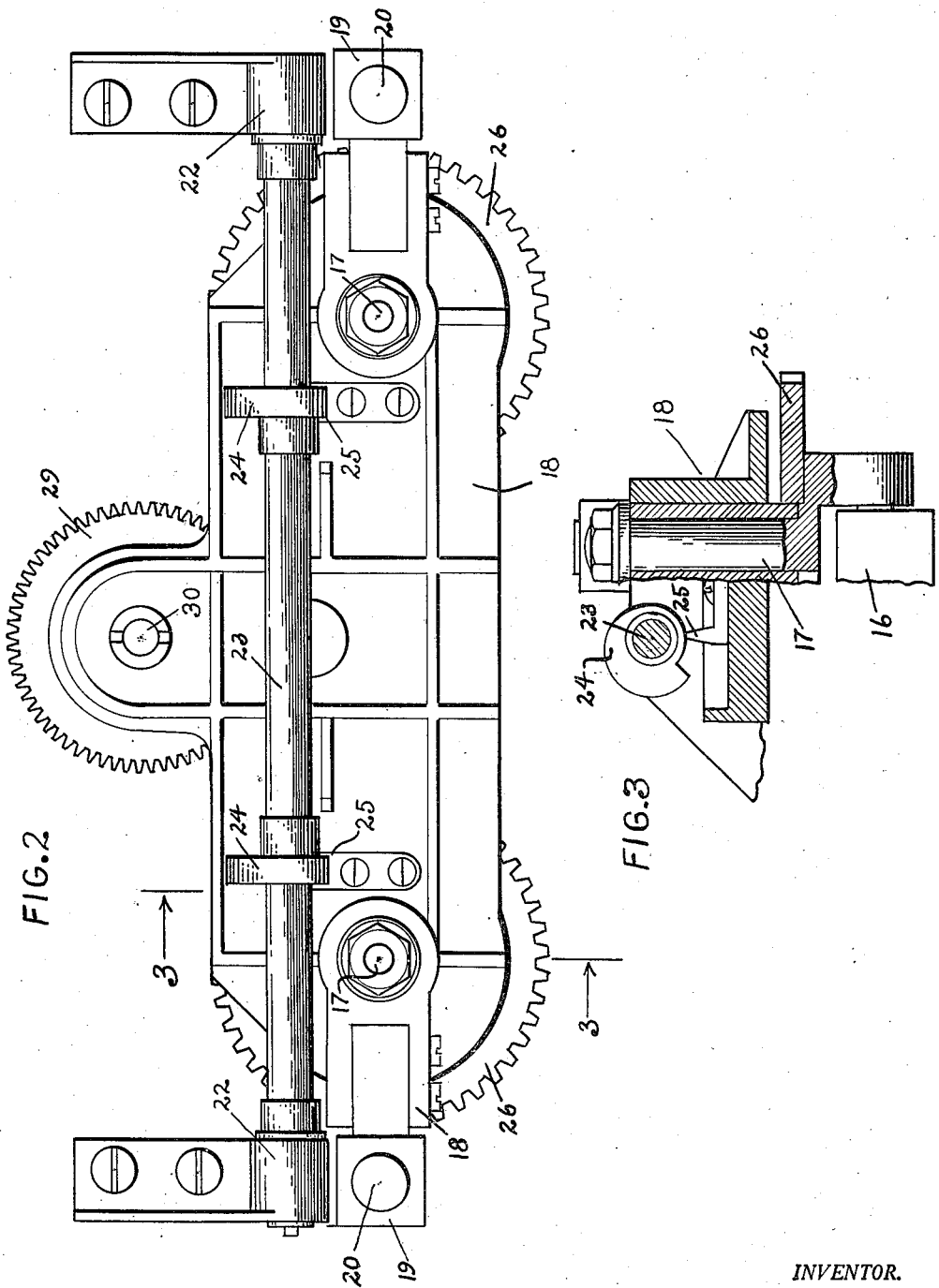

2,395,715

UNITED STATES PATENT OFFICE 2,395,715

ADJUSTING MECHANISM FOR FLUID METERS

William F. Berck, Oakland, Calif., assignor to Ralph N. Brodie Company, Oakland, Calif., a corporation of California Application November 7, 1944, Serial No. 562,307

4 Claims. (Cl. 73—242)

This invention relates to fluid meters of the displacement type and particularly pertains to a mechanism for varying the displacement of such meters for the purpose of calibrating the same.

One well known type of fluid meter of the displacement type employs two reciprocable and oscillatory pistons. Such a meter is described and illustrated in Letters Patent of the United States No. 1,895,318. In this meter the two pistons are connected with interconnected cranks which cause the pistons to oscillate and to reciprocate. This oscillation effects synchronous port registration so that the pistons will be operated in synchronism by the pressure of inlet fluid. The stroke of the pistons is determined by the length of the throw of the cranks so that by varying such throw, the displacement of the pistons may be changed to effect calibration of the meter.

It is the principal object of my present invention to provide an improved means of varying the crank throw in meters of the character referred to, which means is simple in construction and positive and efficient in operation.

One form which the invention may assume is exemplified in the following description and illustrated by way of example in the accompanying drawings, in which:

Fig. 1 is a fragmentary view in transverse section through a liquid meter embodying the preferred form of my invention.

Fig. 2 is a plan view of the adjustment mechanism of the meter by means of which the throw of the cranks connected with the pistons may be varied.

Fig. 3 is a transverse sectional view through such mechanism taken on line 3—3 of Fig. 1.

Referring more particularly to the accompanying drawings, 10 indicates a fluid meter of the type disclosed in Letters Patent of the United States No. 1,895,318.

In general, this meter comprises two cylinders 11 arranged in parallelism, in each of which is disposed a reciprocable and oscillatory piston 12. As is disclosed in the aforesaid patent, these pistons and cylinders are fitted with cooperating ports for the inlet and discharge of fluid, which ports are so arranged so that the pistons are operated in timed relationship by the pressure of inlet fluid and each alternately displaces a given quantity of fluid. The strokes of these pistons are counted and the count is interpreted or translated into gallons of fluid passing through the meter.

The manner in which the foregoing is accomplished and the structure for so doing is fully disclosed in the aforesaid Letters Patent of the United States.

Each piston is provided with a radially projecting crank pin 14 which is connected by a ball and socket joint 15 to one end of a crank lever 16. This crank lever revolves about an axis which is perpendicular to the axis along which the piston 12 reciprocates. The crank lever 16 revolves about a center which is radial to the center of the piston 12, and for this reason it is pivotally connected to a crank shaft 17 whose longitudinal axis is radial to the piston 12. The pivotal connection between the crank lever 16 and the crank shaft 17 enables the position of the latter to be adjusted toward and away from the piston center. That is to say, the pivotal connection between the crank lever 16 and the crank shaft 17 is such that the crank lever 16 may swing in a plane including the axis of the crank shaft 17.

Obviously, by adjusting the axial position of the shaft 17 with relation to the piston 12, the effective throw of the crank lever 16 will be varied and, consequently, the stroke of the piston will be varied in direct proportion thereto in that the throw of the crank lever represents the amount of endwise movement permitted the piston on each side of center. As illustrated in the drawings, there is one crank shaft 17 and its associated mechanism for each piston. The crank levers 16 are set at ninety degrees apart for proper cycling of the piston operation.

For the purpose of enabling varying of the effective stroke of the crank levers 16 by means of adjusting the position of the crank shafts 17 toward and away from the pistons, the latter are rotatably mounted in a crosshead 18. The crank shafts 17 are, however, secured from endwise movement in said crosshead. This crosshead extends transversely of the meter casing and is mounted thereon for movement toward and away from the centers of the cylinders in a plane perpendicular to the axial centers of the cylinders.

For this movement the crosshead is formed with crosshead guides 19 at opposite ends thereof which are reciprocable on fixed pintles 20 secured to the meter casing. Compression springs 21 are interposed between a fixed part of the meter casing and the underside of the guides 19, which springs constantly tend to force the crosshead radially outward with respect to the centers of the cylinders. Journalled in bearings 22 relatively fixed to the meter casing is a cam shaft 23 carrying two cams 24 spaced equal distances on opposite sides of the center of the crosshead. These cams are of the snail type and their peripheral surfaces are adapted to engage fixed bearing surfaces 25 fixed on the crosshead 18. The cam shaft 23, of course, extends longitudinally of the crosshead and overlies the same, as illustrated, so that by turning the cam shaft, the cams will so engage the crosshead that the latter may be forced toward the centers of the cylinders against the action of the springs 21. Therefore, the circumferential position of the cams actually determines the effective stroke of the crank levers 16 and, therefore, determines the effective stroke of the pistons 12.

The cam shaft 23, as illustrated in the drawings, is mounted on its ends in the bearings 22 mounted on the meter casing, the construction of which is such that the cam shaft 23 will be frictionally held in any circumferentially adjusted position. However, one end of the cam shaft is formed to receive a key or wrench which may be inserted from the exterior of the meter casing to turn the cam shaft and thus adjust or calibrate the meter.

To interconnect the crank levers 16 and to drive the meter counter, each crank shaft 17 is fitted with a spur gear 26 which meshes with a center gear 27. This interconnection between the crank shafts causes the same to operate in synchronism so that the pistons 12 will operate in proper timed relation. The center gear 27 is fitted with a relatively fixed gear 28 which meshes with a counter drive gear 29 fixed on a counter drive shaft 30. Inasmuch as the actual driving of the counter forms no part of my present invention, the counter itself and its connection with the counter drive shaft is not illustrated.

It will be seen from the drawings and from the previous description, however, that the counter drive shaft 30 and the gear train, which comprises the gears 26, 27, 28 and 29, are all operatively carried by the crosshead 18 so that they move in unison therewith.

In operation of the device, it is constructed and assembled as shown in the drawings. As the meter commences operating, the pistons 12 will, of course, reciprocate, and due to their connection with the crank levers 16, they will operate in synchronism, all as described in the aforesaid Letters Patent of the United States. The stroke of the pistons will, of course, be determined by the effective stroke of the crank levers 16.

If it is desired to calibrate the meter, it is only necessary to rotate the cam shaft 23 to adjust the position of the crosshead with respect to the centers of the cylinders. By so doing, the crank shafts 17 will be moved toward and away from the centers of the cylinders, depending upon whether or not it is desired to increase or decrease the length of the piston strokes. Obviously, if the crank shafts 17 are moved toward the centers of the cylinders, the length of the stroke of the crank levers 16 will be increased, and if the crank shafts 17 are moved in the opposite direction, the length of the stroke of the crank levers 16 will be decreased.

Thus, by varying the position of the crosshead, the displacement of the pistons will be varied. Obviously, the springs 21 will constantly urge the crosshead to its outermost position and that position will be determined by the circumferential position of the cams 24.

Therefore, to calibrate the meter, it is only necessary to revolve the cam shaft 23 in the proper direction to either increase or decrease the effective stroke of the pistons in the cylinders 11.

From the foregoing it is obvious that I have provided a very efficient and positive mechanism for varying the displacement of meters of the character referred to, and while I have shown the preferred form of my invention, it is to be understood that various changes may be made therein by those skilled in the art without departing from the spirit of the invention as defined in the appended claims.

Having thus described my invention, what I claim and desire to secure by Letters Patent is:

1. In a liquid meter having a reciprocable and oscillatory piston therein, a crank pin radially extending from the periphery of said piston, a crank connected with said pin and adapted to revolve about an axis perpendicular to the axis of said piston, a member rotatable about the axis of revolution of said crank and to which said crank is connected, a pivotal connection between said crank and said member enabling said crank to swing relative to said member in the plane of the longitudinal axis of said member, means for adjusting said member toward and away from the axis of the piston to vary the effective stroke of said crank.

2. In a liquid meter having a casing formed with a cylinder therein and a reciprocable and oscillatory piston in said cylinder, a crank pin connected with said piston and extending radially therefrom, a crank connected with said pin and adapted to revolve about an axis perpendicular to the axis of the piston and radial with respect thereto, a crosshead guided for movement on said casing radially with respect to said piston, a crank shaft rotatably mounted in said crosshead with its axis perpendicularly and radially disposed with respect to the axis of the piston, a pivotal connection between said crank and said crank shaft enabling relative swinging movement therebetween in the plane of the axis of the shaft, and means for adjusting the position of said crosshead toward and away from the axis of said piston.

3. In a liquid meter having a casing formed with a cylinder therein and a reciprocable and oscillatory piston in said cylinder, a crank pin connected with said piston and extending radially therefrom, a crank connected with said pin and adapted to revolve about an axis perpendicular to the axis of the piston and radial with respect thereto, a crosshead guided for movement on said casing radially with respect to said piston, a crank shaft rotatably mounted in said crosshead with its axis perpendicularly and radially disposed with respect to the axis of the piston, a pivotal connection between said crank and said crank shaft enabling relative swinging movement therebetween in the plane of the axis of the shaft, and means for adjusting the position of said crosshead toward and away from the axis of said piston, said means comprising a cam rotatably mounted on the casing and engaging a fixed point on the crosshead, and spring means constantly tending to maintain said crosshead in engagement with said cam.

4. In a liquid meter having a casing formed with a cylinder therein and a reciprocable and oscillatory piston in said cylinder, a crank pin connected with said piston and extending radially therefrom, a crank connected with said pin and adapted to revolve about an axis perpendicular to the axis of the piston and radial with respect thereto, a crosshead guided for movement on said casing radially with respect to said piston, a crank shaft rotatably mounted in said crosshead with its axis perpendicularly and radially disposed with respect to the axis of the piston, a pivotal connection between said crank and said crank shaft enabling relative swinging movement therebetween in the plane of the axis of the shaft, means for adjusting the position of said crosshead toward and away from the axis of said piston, said means comprising spring means constantly tending to move said crosshead in a direction away from the axial center of the piston, and a rotatable cam engaging said crosshead in opposition to said spring means and capable of moving said crosshead in a direction toward the axial center of said piston.

WILLIAM F. BERCK.